United States Patent [19]

Connell

[11] 4,334,873

[45] Jun. 15, 1982

[54] ICEBERG PROPULSION SYSTEM

[76] Inventor: Joseph A. Connell, P.O. Box 168, Harbor City, Calif. 90710

[21] Appl. No.: 95,070

[22] Filed: Nov. 16, 1979

[51] Int. Cl.³ .............................................. B63H 23/32
[52] U.S. Cl. .................................... 440/113; 440/38; 114/56
[58] Field of Search .................................. 114/40–43, 114/56, 65 R, 270; 440/38, 39, 47, 113

[56] References Cited

U.S. PATENT DOCUMENTS

| | | | |
|---|---|---|---|
| 1,595,888 | 8/1926 | Stanley | 440/38 |
| 3,384,047 | 5/1968 | Remley | 440/39 |
| 4,177,748 | 12/1979 | Mougin | 114/270 X |
| 4,178,872 | 12/1979 | Mougin | 440/113 |
| 4,209,991 | 7/1980 | Anderson | 114/270 X |

OTHER PUBLICATIONS

Husseiny; "Iceberg Utilization", 10-77, pp. 359–378.

Primary Examiner—Joseph J. Rolla
Attorney, Agent, or Firm—Knobbe, Martens, Olson, Hubbard & Bear

[57] ABSTRACT

A tabular iceberg is used as an energy source for a propulsion system which propels the iceberg across vast distances of the ocean with minimal fuel consumption. The iceberg thus becomes, in effect, a self-propelled vessel in which potential energy associated with the iceberg is converted to kinetic energy to power the propulsion system. Two propulsion mechanisms can be used, preferably in conjunction. The first mechanism uses the gravity flow of melting ice to provide propulsive thrust, while the second mechanism utilizes the temperature differential between the iceberg and the surrounding water to power a heat cycle engine, which, in turn, drives a generator to provide electricity which runs propeller drive motors.

27 Claims, 4 Drawing Figures

ICEBERG PROPULSION SYSTEM

BACKGROUND OF THE INVENTION

This invention relates to a propulsion system for an iceberg, and, in particular, it relates to a system for converting the iceberg into a self-propelled vessel.

Fresh water has long been recognized as the most important of the earth's resources. In fact, it has been stated that the availability of fresh water defines the limits of human activity.

Water is hardly a scarce resource; approximately 1.4 billion cubic kilometers of it cover approximately 80 percent of the earth's surface. However, of this amount, only about 9 million cubic kilometers (about 6/10 of one percent of the total) is both liquid and fresh. Although 9 million cubic kilometers is still a large quantity of water, this total supply is unevenly distributed throughout the earth. Thus, there are vast land areas which are too arid to support any significant degree of human activity, particularly agriculture.

With the world's human population growing rapidly, the need to bring these vast arid areas under cultivation is becoming more and more acute. In order to do so, however, vast quantities of fresh water must be supplied. Currently, the most popular concept for supplying large quantities of irrigation water to these arid areas is that of sea water desalination. However, this concept has achieved only limited success in practice, largely due to the great costs involved in constructing and operating sea water desalinating plants.

However, in recent years, increasing recognition is being given to the fact that vast quantities of fresh water are stored in the form of ice. In fact, approximately 30 million cubic kilometers of fresh water, or about ¾ of the total world supply of this substance, is in the frozen state. About 90 percent of this ice is contained in the continental ice sheet and the ice shelves of Antarctica, with most of the rest being contained in the Greenland ice sheet. The major obstacle to the utilization of this vast store of fresh water has been the problem of transporting the ice from the ice sheet to the areas where the water is needed. Until now, the only solution which has been proposed to this problem is that of capturing the massive icebergs which break off of these sheets and towing them across vast expanses of ocean to seaports where the icebergs can be controllably melted to supply fresh water. That the current state of the art is limited to the concept of towing the icebergs is amply demonstrated in an article entitled "The Iceberg Cometh" by W. F. Weeks and Malcolm Mellor, appearing in *Technology Review*, Volume 81, No. 8, August/September 1979.

However, the concept of towing an object as immense as an iceberg is not without great difficulties, such as, for example, the tremendous amounts of fuel that would be consumed by the towing vessels and the difficulty in maneuvering and controlling the iceberg under tow. These practical considerations have confined the towing concept to the drawing board, so to speak. Thus, to date, there has been no attempt to tow an iceberg any appreciable distance. In fact, the only successful iceberg towing which has been accomplished has been that of towing an iceberg a relatively short distance for the purpose of deflecting the iceberg from a collision course with an offshore structures, such as a drilling rig.

Since the concept of towing icebergs has not yet proved its feasibility, there is a growing need for alternative methods of iceberg transportation which would avoid the difficulties which have heretofore kept the towing concept from fruition. One such concept would be that of converting the icebergs themselves into self-propelled vessels. Such a concept was first developed during World War II, when the British Navy investigated the possibility of using modified icebergs as "unsinkable" aircraft carriers to be used in the invasion of Japan. In accordance with this concept, it was proposed to drive the icebergs or "bergships" with about 20 electric motors of approximately 1100 horsepower each, powered by a 24 megawatt turbo electric generator. None of these bergships were ever built, and the project was abandoned in 1944.

While the British bergship concept would have many advantages over towing, particularly with regard to the ability to maneuver and navigate the iceberg, this concept has been largely ignored by those presently involved in the study of iceberg transportation, primarily because of the great costs involved in constructing the necessary turbo-electric generators, as well as the expense of operating these units in view of the massive fuel requirements involved.

In view of the foregoing discussion, it can be readily appreciated that providing a "bergship" with a relatively low cost, highly energy efficient propulsion system would solve the major problems heretofore encountered in the area of iceberg transportation, and would therefore prove to be of incalculable value in allowing mankind to unlock nature's greatest storehouse of the earth's most valuable resource.

SUMMARY OF THE INVENTION

Broadly speaking, the present invention comprises a system whereby a tabular (i.e., flat) iceberg is converted into a self-propelled vessel, wherein potential energy associated in various forms with the iceberg is used as a principal source of power for the propulsion mechanism.

In accordance with this concept, after a suitable tabular iceberg is selected (as will be explained in detail below), it is outfitted so that it becomes, in every sense of the word, a "ship" made of ice. For propulsion, two types of drive mechanisms can be used, preferably in conjunction. The first type of propulsion system makes use of the fact that a typical tabular iceberg from the Antarctic ice sheet normally rises approximately 30 to 40 meters above the ocean's surface. Using solar energy, a large reservoir of melted iceberg water is produced. This water is then conducted by gravity flow through conduits down along the sides of the iceberg, and allowed to discharge through water jets slightly below the surface of the ocean. The water falling from such a height develops a substantial head which provides a significant amount of thrust through the water jets to move the iceberg. By providing several such water jet outlets, each of which being variable in direction, the iceberg can be maneuvered and steered.

The second type of propulsion system uses a thermal cycle engine, such as a Carnot cycle engine. Such a heat cycle engine is advantageous in that it could be powered, at least in substantial part, from the natural temperature differential between the iceberg and the surrounding sea water, although in the colder polar waters it may be necessary to augment this temperature differential using coal or oil-fired boilers. The Carnot engines are used to drive electric generators which provide the power for electric propellor drives.

The two propulsion systems could be operated independently or in conjunction so that, for example, the propellor drive system powered by the Carnot cycle engines can be used for the main propulsion system, with the water jet system being used when added power is needed, as in entering or leaving ocean currents.

Having its own propulsion system, the iceberg is fitted out with a navigation and control system, thereby making it, in every sense of the word, a ship. Thus equipped, the iceberg is ready for travel from the Antarctic ice sheet to a seaport where it is controllably melted to produce fresh water.

DETAILED DESCRIPTION OF THE INVENTION

To carry out the present invention, it is advantageous to select the proper iceberg. As previously mentioned, nearly all of the world's icebergs originate in either the Antarctic or Greenland ice sheets, from which the bergs are broken off or "calved". For the purposes of this invention, the icebergs originating in the Antarctic are far more desirable than those originating in Greenland, due to the fact that Antarctic tabular icebergs are much more uniform in shape and size than Greenland icebergs. Thus, for example, Antarctic tabular icebergs typically are in the configuration of relatively flat slabs of approximately 200 to 250 meters in thickness, with all but approximately the uppermost 30 or 40 meters being submerged below the ocean's surface.

While the typical iceberg calved from the Antarctic sheet averages about 1 kilometer in length and between one-half and one kilometer in width, icebergs up to 10 kilometers in length and 5 to 10 kilometers in width are not uncommon. As a matter of economics, it is preferable, for the purposes of this invention, to select icebergs which are between 5 and 10 kilometers in length and which are approximately half as wide as they are long. Once an iceberg of suitable dimensions is located, it is inspected, preferably by remote sensing techniques such as radioecho sounding, to disclose hidden flaws. Thus, the final selection of an iceberg would depend upon such factors as size, shape and structural integrity, as well as its nearness to the desired destination.

Once a suitable iceberg is selected, the process of converting it to a self-propelled vessel can begin. This is accomplished by attaching to the iceberg the structure shown in FIG. 1.

Figure 2:
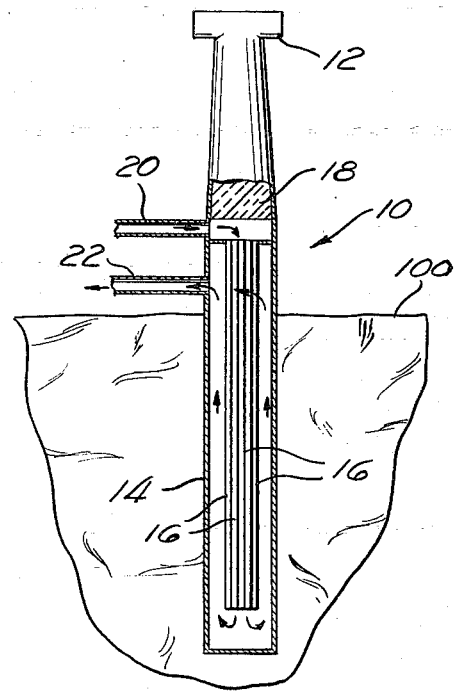
FIG. 2 is a cross-sectional view of the supercooled structural mast used in conjunction with the present invention.

A major problem in attaching any structure to an iceberg is that heat from the atmosphere is conducted through the structure and tends to melt the ice within the area of attachment. In order to overcome this problem, super cooled support masts, one of which is shown in FIG. 2, are used to support all of the structure which is attached to the iceberg. Referring now to FIG. 2, a typical super cooled support mast 10 is shown embedded in a tabular iceberg 100. As illustrated, the upper portion of the support mast 10 comprises a pedestal 12 for attachment to the structure to be supported, while the lower portion of the mast comprises a hollow tubular casing 14 which is closed at the bottom, which casing contains plural tubular cooling fluid passages 16. Between the upper and lower portions of the mast 10 is a relatively thick central portion 18 comprised of a thermally insulating material.

In operation, a cooling fluid, preferably brine, is cooled to a temperature several degrees below zero degrees centigrade by a refrigeration system (not shown) and is then pumped into a fluid inlet 20 in the mast 10. The inlet 20 communicates with the fluid passages 16 so that the super cooled brine is led down into the bottom of the casing 14 from which it flows upward and out of the mast through a fluid outlet 22 leading back to the refrigeration machinery. Thus, the flow of super cooled brine through the lower portion of the mast 10, which is embedded in the ice, maintains the casing 14 at a temperature which is substantially below the freezing point of the ice, and since the casing 14 is of a thermally conductive material, the ice in the area around the embedded portion of the mast is maintained in a solid state.

One convenient way of installing the mast 10 into the ice would be to connect the inlet 20 to a source of very hot fluid so that the casing 14 is heated to a temperature approaching 100 degrees centigrade. At the same time, pressure can be applied to the pedestal portion 12 so that the mast, in effect, melts its way into the ice up to the desired depth of penetration. Once this depth is achieved, the mast can be connected to the super cooled brine circulation system described above, with the mast being held in place by suitable means until the casing 14 is locked into the ice by the freezing thereof. If necessary, water can be injected into the hole in the ice around the mast, so that the freezing of the water in the hole will ensure that the mast is firmly supported in the ice. The continued removal of heat from the ice by the supercooled brine will cool the surrounding ice and prevent it from melting. The ice will thus become super-cooled where it is in contact with the mast 10. This will not only prevent melting of the ice, but will also spread structural loading over a large area. Thus, the super-cooled mast 10 can be used to support the buildings and equipment which will be used to convert the iceberg into a self-propelled vessel, as will be presently described.

Figure 1:
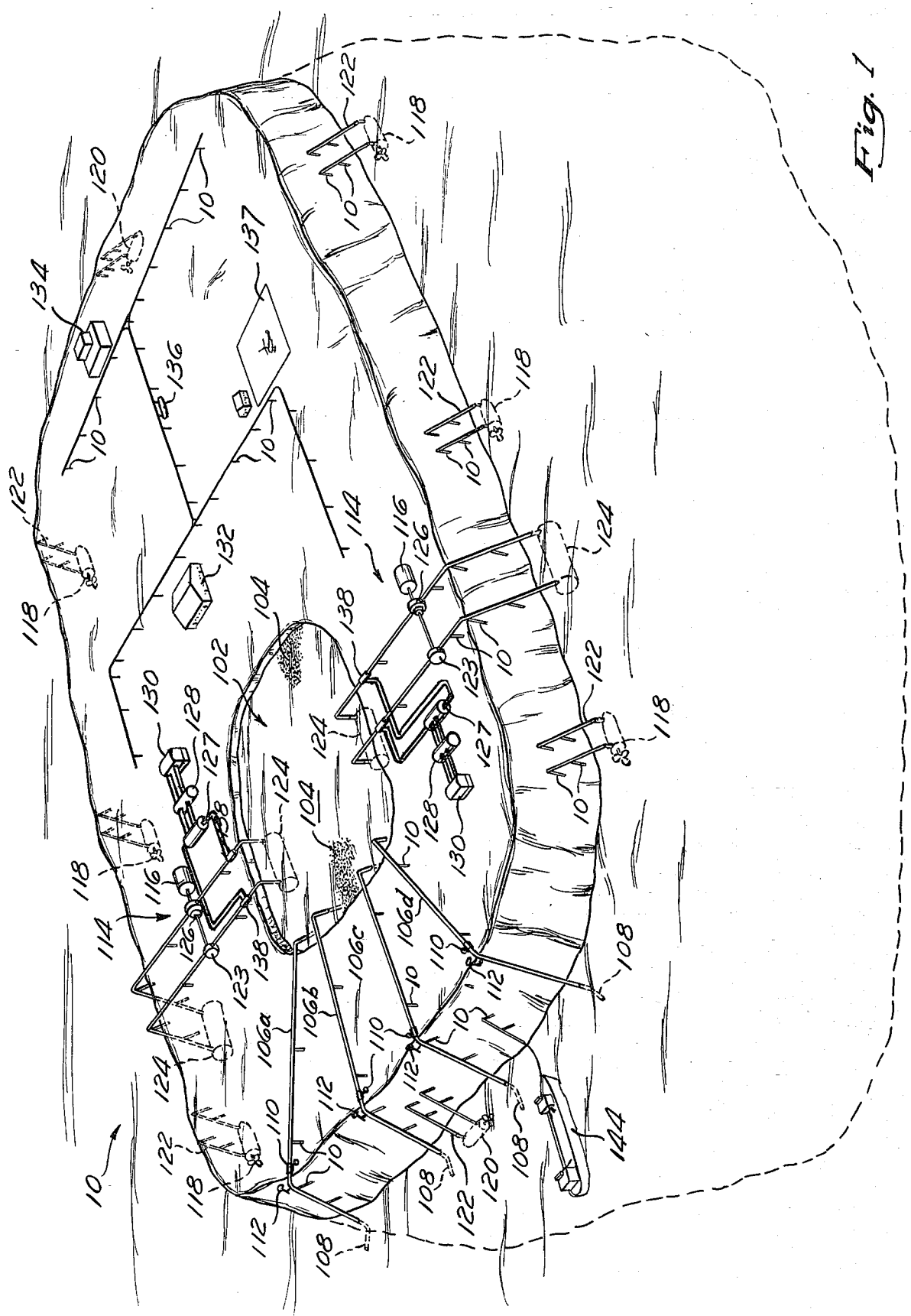
FIG. 1 is a perspective view of a self-propelled iceberg in accordance with the present invention.

Referring now to FIG. 1, the aforementioned structures and equipment will now be described.

Central to the propulsion system used in the present invention is a large reservoir 102 of melted iceberg water which covers as much of the upper surface of the iceberg as possible, and is shown located near the aft end of the iceberg. This reservoir can be provided conveniently by using solar energy to melt a portion of the upper surface of the iceberg. Specifically, a radiation absorbing substance or material can be applied to that portion of the iceberg which is desired to be melted. For example, a coating of fine coal dust can be applied or, as depicted in the drawings, a sheet 104 of black, non-reflective material can be placed over a portion of the iceberg's surface. In either case, the enhanced absorption of the sun's radiation will result in sufficient melting of the ice to provide the reservoir 102.

As previously mentioned, the reservoir 102 is shown in the aft portion of the iceberg 100. Accordingly, as shown in the drawings, the end of the iceberg closest to the reservoir 102 can be defined as the "stern" of the iceberg vessel, while the other end can be defined as the "bow".

The water stored in the reservoir 102 is of primary importance as the principal source of energy for propelling the iceberg. Specifically, the water in the reservoir 102 is viewed as a means of storing two forms of potential energy which can be converted to kinetic energy to provide power for propulsion. In one form, the potential energy is stored as gravitational potential energy, and, in the other form, the energy is stored as thermal energy. Each form of energy is used to provide power for one of the two propulsion mechanisms, as will be presently described.

The first propulsion mechanism comprises a plurality of conduits 106a, b, c and d, leading from the reservoir 102 down the stern end of the iceberg and terminates below the surface of the ocean in a water jet nozzle 108. In operation, water from the reservoir 102 flows down one or more of the conduits 106a, b, c and d, developing a substantial head due to the 30 or 40 meter drop from the top of the iceberg to the ocean's surface. Thus, when the water is discharged through the water jet nozzles 108, a significant amount of thrust is developed to move the iceberg forward. Because water will normally flow out of the reservoir 102 and down the conduits 106a, b, c and d by siphon action, it may be advantageous to provide a small pump (not shown) to initiate this siphon action. Also, the flow of water through each of the conduits 106a, b, c and d may be regulated by a valve 110.

With the aforementioned water jet propulsion system, steering may be accomplished in either of two ways. Specifically, as shown in FIG. 1, the nozzle 108 on the outermost port conduit 106a is directed toward the port side of the vessel, the nozzle 108 of the outermost starboard side conduit 106d is directed toward the starboard side of the iceberg, and the nozzles 108 of the innermost conduits 106b and c are substantially aligned along the longitudinal axis of the iceberg and are thereby aimed substantially directly astern. Thus, if it is desired to turn the iceberg vessel to port, the valve 110 for the conduit 106a is opened and the valves 110 for the other conduits are closed, thereby permitting water to be discharged only in a direction which results in the turning of the iceberg toward the port side. Similarly, if the valve 110 for the outermost starboard conduit 106d is opened and the other valves 110 are closed, the vessel will turn toward the starboard. If straight ahead motion is desired, water is allowed to discharge only through the central conduits 106b and c with the valves 110 for the outermost conduits 106a and 106d being closed.

Alternatively, each of the nozzles 108 can be made independently adjustable for angular orientation with respect to the longitudinal axis of the iceberg by such means as a lever 112 located on the upper portion of each of the conduits 106a, b, c and d, adjacent the valves 110 and connected by a suitable linkage (not shown) to the nozzle 108 to effect the turning thereof. This latter system provides greater flexibility than the former and also allows the full measure of maneuverability with only one water jet conduit.

The gravitational flow/water jet propulsion system described above could conceivably be used as the sole means of propulsion for short voyages. However, for the extremely long voyages for which the present invention is contemplated, the water jet system is more appropriately used as a supplement to a main propulsion system for providing added thrust during periods of short duration, such as when relatively quick maneuvering is needed to avoid an obstacle or to enter or leave ocean currents.

The primary propulsion system uses a plurality of thermal cycle engines, preferably Carnot cycle engines, although Stirling cycle engines may also be used. In the embodiment illustrated in the drawings, two Carnot cycle engines 114 are used, each driving an electrical generator 116. The electricity from the generators 116 powers a plurality of electrical propeller drive units 118. The drive units are of the full-reverse type, and are preferably rated at between 1,000 and 2,000 horsepower each. As shown, there are six drive units 118, each generator 116 powering three of the drive units 118. The drive system shown, comprising two Carnot cycle engines, two generators, and six propeller drives is exemplary only, the number of engines, generators, and drive units being determined by such factors as the size of the iceberg, and the power output of the engines, generators, and drive units. The output power of the entire system, however, should be sufficient to move the iceberg at about 1.5 to 2 knots.

Also driven by the generators are a pair of steering propeller drive units 120, one at the bow, and one at the stern of the iceberg, and directed in opposite directions from each other. This arrangement allows a high degree of maneuverability for the iceberg. If necessary, additional steering units 120 can be provided. All, however, should be of the full-reversing type, so that the iceberg can be pivoted in either direction.

The drive units 118 and 120 are each mounted on a pair of vertical guides 122, each of which, in turn, is height-adjustably mounted on a pair of the super-cooled masts 10. Initially, the masts 10 are set into the ice at about 15 meters above the water line, and the guides 122 are set so that the drive units 118 and 120 are just below the ocean's surface. As the iceberg gradually melts during its voyage, the height of the masts 10 above the water line will decrease, so that the guides 122 will have to be raised to keep the drive units at the proper depth. On a long voyage, the height of the masts may descend to as low as 5 meters above the water line; at that point they will have to be removed (by pumping hot fluid through them, as previously described) and reinstalled at the initial 15-meter height.

As previously mentioned, the generators 116 are turned by Carnot cycle engines 114. The principles of operation of the Carnot cycle engine are well known, and therefore need not be explained in detail.

Briefly summarized, a Carnot cycle engine produces work from a thermal gradient, thereby, in effect, converting thermal potential energy into kinetic energy.

To do this, the Carnot cycle engine uses a working medium comprising a fluid. Theoretically, any fluid which expands with rising temperature and decreasing pressure can be used. In practice, however, a light hydrocarbon fluid, such as freon, is preferred, since it is desirable to have a fluid which changes readily between its liquid and gaseous phases within the operative temperature and pressure ranges of the engine.

Figure 3:
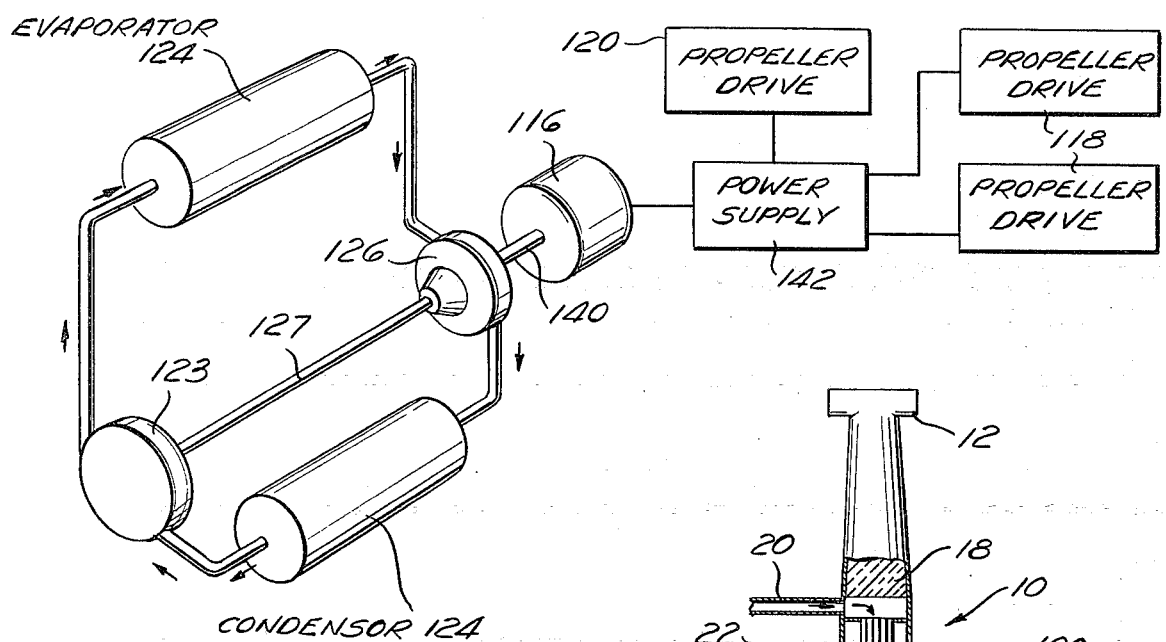
FIG. 3 is a schematic representation of a thermal cycle propulsion system used in the present invention.

FIG. 3 illustrates schematically the operation of a Carnot cycle engine. The working fluid (freon) is pressurized to a given pressure by a pump 123 and conducted into a first heat exchanger 124, or "evaporator", in which the fluid is raised to a temperature ($T_1$) which is above the fluid's boiling point at the given pressure. The fluid, now in its gaseous state, and still under pressure, is conducted into a turbine 126 and is allowed to expand adiabatically, causing the turbine to turn, and thereby producing kinetic energy (work). From the turbine, the gas is conducted to a second heat exchanger 124, or "condensor", where it is lowered to a temperature ($T_2$) which is low enough to return the fluid to its liquid phase. From the condensor, the fluid is returned to the pump 123 to start the work cycle again. It can be seen that the pump 123 is driven by the turbine 126 through a drive shaft 127. The overall thermal efficiency (q) of the engine is proportional to the difference between the evaporator temperature ($T_1$) and the condensor temperature ($T_2$) by the formula:

$$q = (T_1 - T_2)/T_1 = 1 - T_2/T_1,$$

where $T_1$ and $T_2$ are measured on the absolute, or Kelvin, scale.

Referring once again to FIG. 1, the Carnot cycle engines 114 are each shown with a pair of heat exchangers 124 which can function as either evaporators or condensors, depending upon circumstances, as will be presently described.

When the iceberg is in the relatively warm waters north of the Tropic of Capricorn, the temperature gradient between the iceberg and the ocean water is on the order of 20° K. Thus, by the formula given above, the Carnot cycle engines will operate with an efficiency of about 7%. (Although this efficiency is relatively low, it should be remembered that, due to its enormous inertia, only a moderate amount of power is needed to keep the iceberg moving once it is initially set in motion, especially when the iceberg is being carried by an ocean current.)

One of the pairs of heat exchangers 124 associated with each Carnot cycle engine is submerged in the ocean water, while the other is submerged near the bottom of the reservoir 102. In the circumstances described above, i.e., when the ocean water is substantially warmer than the iceberg, the heat exchangers submerged in the ocean will be operated as evaporators, while those submerged in the reservoir will be operated as condensors, since the temperature near the bottom of the reservoir will be only slightly above that of the iceberg, i.e., 0° C. (273° K.).

When the iceberg is in cooler polar waters, the temperatures of the iceberg and the ocean water will be approximately the same, yielding unacceptably low thermal efficiencies for the Carnot cycle engines if they are operated in the above-described manner. When such circumstances prevail, the requisite temperature differential between the evaporators and the condensors can be obtained by using the heat exchangers 124 submerged in the ocean water as condensors, and by using an auxiliary heat exchanger 127, associated with each of the Carnot cycle engines, as an evaporator. The auxiliary heat exchangers 127 could be provided with heat, so as to function as evaporators, by a pair of boilers 128, for example, which, in turn, would use the waste heat generated by a pair of internal combustion engines 130, preferably gas turbines. The engines 130 would advantageously be used to turn a "life support" generator (not shown) which would provide electrical power for a crew's living quarters 132, a "bridge" 134 (from which the iceberg would be navigated), and a monorail 136 connecting the buildings 132 and 134, and a heliport 137. Any waste heat from the engines 130 that is not used in the boilers 128 can be used to contribute to the space heating of the buildings 132 and 134.

The auxiliary heat exchangers 127 would preferably be connected to the Carnot cycle engines 114 through valves 138, as would the heat exchangers 124 submerged in the reservoir 102. Thus, when the iceberg is in cold polar waters, the appropriate valves 138 would be actuated to connect the auxiliary heat exchangers 127 to the Carnot cycle engines, while the heat exchangers 124 submerged in the reservoir 124 would be isolated from the Carnot system. Once the iceberg had moved into the warmer waters, the auxiliary heat exchangers would be shut down, via the valves 138, while the heat exchangers 124 in the reservoir 102 would be connected to the system. The pumps 123 would be reversed, since this changeover would result in the evaporators and condensors being switched over to opposite sides of the engines 114.

Using the boilers 128, the fluid in the auxiliary heat exchangers 127 can be heated to about 100° C. (373° K.) yielding a temperature differential with the ocean water of between 75° K. and 95° K. Thus, even in tropical waters, the Carnot engines will have a thermal efficiency of over 20 percent, while in polar waters, a thermal efficiency as high as 25 percent can be achieved. Due to this highly increased efficiency, it may be desirable (for example, in an emergency situation) to use the auxiliary heat exchangers 127 full time, thereby increasing the iceberg's speed and correspondingly decreasing its transit time. Thus, the heat exchangers 124 submerged in the reservoir 102 would not be necessary. However, such a system would not make use of the potential energy associated with the iceberg, and would therefore consume a substantial amount of fuel.

Turning once more to FIG. 3, it is seen that the generator 116 is driven by the turbine 126 through a drive shaft 140. The electrical output of the generator 116 is fed into a power supply network 142, in which the generator output is converted into a DC current of the proper voltage to run the propeller drives 118 and 120.

As previously mentioned, the above-described thermal cycle system, driving the propeller drive units 118, is the main propulsion system of the iceberg, augmented, when necessary, by the gravity flow water jet system, previously described. Using these two propulsion systems in concert, the iceberg can easily be navigated to southern hemisphere ports, as in South America, southern Africa, and Australia. Should a northern hemisphere destination be desired, use could be made of the various northward-moving ocean currents such as, for example, the Humboldt or Peru current off of the western coast of South and Central America.

Navigation would be accomplished by conventional means, such as that used in nuclear submarines. Navigational accuracy should be precise enough to hold a pre-selected course with minimal deviation, and navigational systems having such accuracy are currently in use in other applications, such as automatic surveyor systems.

Finally, it is advantageous to have at least one powered "tender" vessel 144 in tow for maintaining and repairing the propeller drive units, and for storing additional supplies and equipment.

Figure 4:
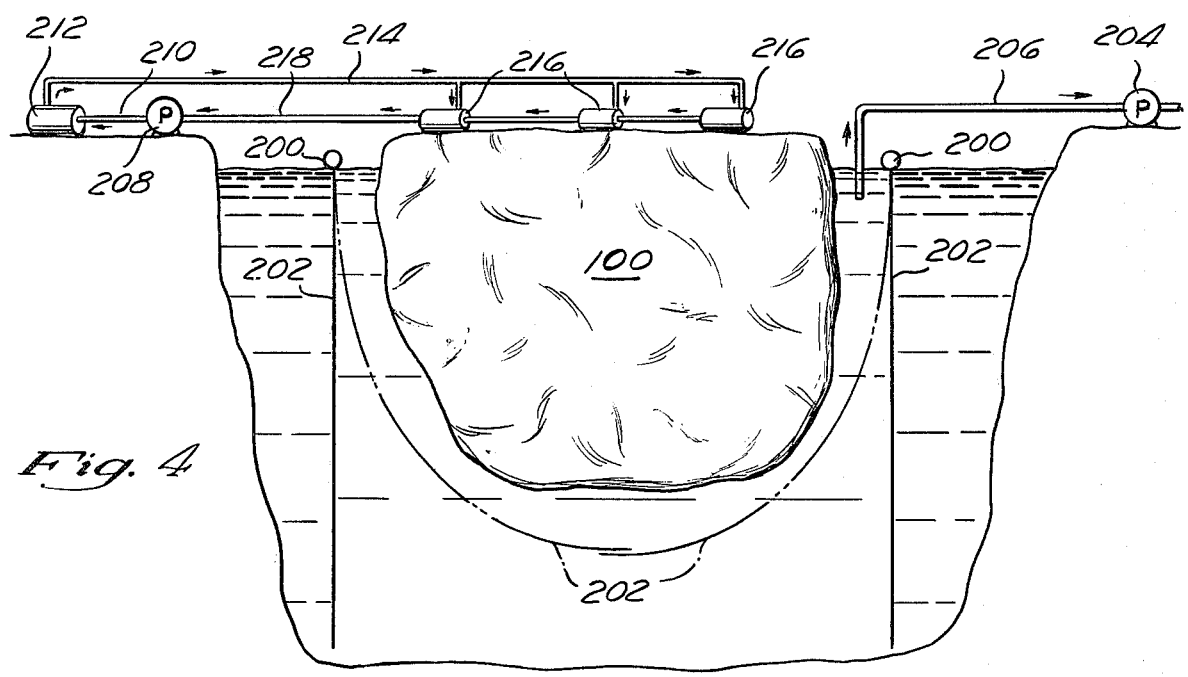
FIG. 4 is a schematic representation of the transported iceberg at its destination, with apparatus for using it as a source of fresh water.

Referring now to FIG. 4, the iceberg 100 is shown at its final destination, i.e., at a mooring in a deepwater harbor of the country having need of the iceberg's water. (The mooring lines are not shown, for the sake of clarity.) In order to obtain fresh water from the melting iceberg, a floating wall 200 is first erected around it. Suspended from the submerged bottom of the wall 200 is a curtain 202, of a plastic or other suitably waterproof material, and of sufficient length to extend below the bottom of the iceberg.

As the iceberg melts, liquid fresh water, which is less dense than the seawater in the harbor, is produced in the area adjacent the iceberg, inside the wall 200 and curtain 202. Since the seawater outside of the curtain 202 is heavier than the fresh water being produced within the curtain, the bottom of the curtain will be gradually pushed in toward the bottom of the iceberg, as shown by the dotted lines in FIG. 4, as the fresh water is removed from the "well" formed by the curtain 202. It is only necessary to pump the fresh water out of the area enclosed by the curtain as fast as it is produced, both by the melting of the iceberg, and by the condensation of moisture from the air in contact with the non-submerged upper portion of the iceberg. Accordingly, a pump 204 is located on the shore (or on a barge in the harbor) with an intake conduit 206 leading into the fresh water area adjacent the iceberg. Thus, the water may be pumped to a suitable storage facility to await distribution.

A heat sink as massive as an iceberg can form the basis of an efficient and inexpensive refrigeration system. Thus, for example, a refrigeration circuit can be provided wherein a pump 208 pumps a refrigerant fluid, such as freon, through conduits 210 to an evaporating heat exchanger 212 located in an area to be cooled or refrigerated. Having absorbed heat from the environment through the evaporating heat exchanger 212, the fluid is ducted, via conduit 214, to one or more condensing heat exchangers 216 located on the iceberg. While in the condensing heat exchangers 216, the fluid gives up its heat to the iceberg, and is then returned to the pump 208 via conduit 218.

An added advantage of this refrigeration system is that the use of the iceberg as the heat sink for the condensing heat exchangers 216 increase the rate of melting of the iceberg, thus facilitating the production of fresh water by the means previously described.

I claim:

1. A self-propelled iceberg, comprising:
   first means for converting potential energy associated with said iceberg into kinetic energy at least a portion of said potential energy being gravitational energy; and
   second means for utilizing said kinetic energy to propel said iceberg.

2. The self-propelled iceberg of claim 1, wherein at least some of said potential energy associated with said iceberg is in the form of a thermal gradient between said iceberg and the ocean water surrounding said iceberg.

3. The self-propelled iceberg of claim 2, wherein said first means includes a heat cycle engine powered by said thermal gradient.

4. The self-propelled iceberg of claim 3, wherein said heat cycle engine operates on the Carnot cycle, and includes first temperature-responsive means on said iceberg and second temperature-responsive means in said ocean water, the temperature gradient between said first and second temperature-responsive means providing the energy for operating said engine.

5. The self-propelled iceberg of claim 4, wherein said first temperature-responsive means is a condensor on said iceberg, and said second temperature-responsive means is an evaporator in said ocean water.

6. The self-propelled iceberg of claim 4, further comprising:
   third temperature-responsive means on said iceberg;
   heat-generating means for creating a substantial thermal gradient between said third temperature-responsive means and said second temperature-responsive means; and
   means for selectively powering said Carnot cycle engine with the thermal gradient between said first and second temperature-responsive means or with the thermal gradient between said second and third temperature-responsive means.

7. The self-propelled iceberg of claim 6, wherein said heat-generating means includes an internal combustion engine.

8. The self-propelled iceberg of claim 1, wherein said iceberg includes means for melting some of said iceberg to provide a reservoir of liquid water.

9. The self-propelled iceberg of claim 8, wherein said reservoir is in the upper surface of said iceberg, and at least some of said potential energy, in the form of gravitational energy, is converted to kinetic energy by water jet means.

10. The self-propelled iceberg of claim 9, wherein said water jet means comprises:
    conduit means for conducting water from said reservoir to the surface of said ocean water; and
    water discharge means, in communication with said conduit means, for discharging water from said conduit means into said ocean water in a manner which provides thrust for said iceberg.

11. The self-propelled iceberg of claim 10, further comprising:
    means for controlling the flow of water through said water jet means.

12. The self-propelled iceberg of claim 10, wherein said water jet means further comprises:
    means for varying the direction of said thrust.

13. The self-propelled iceberg of claim 12, wherein said direction-varying means comprises:
    means for changing the angular orientation of said water discharge means with respect to the longitudinal axis of said iceberg.

14. The self-propelled iceberg of claim 12, wherein said direction-varying means comprises:
    first water discharge means having a first angular orientation with respect to the longitudinal axis of said iceberg;
    second water discharge means having a second angular orientation with respect to the longitudinal axis of said iceberg;
    third water discharge means substantially aligned along the longitudinal axis of said iceberg; and
    means for selectively conducting water through one of said discharge means.

15. A method of propelling an iceberg, comprising the steps of:
    converting potential energy associated with said iceberg into kinetic energy by:
      melting a portion of said iceberg to provide a reservoir of liquid water; and
      allowing said liquid water to fall a substantial distance to convert gravitational potential energy to kinetic energy; and
    utilizing said kinetic energy to propel said iceberg.

16. The method of claim 15, wherein said step of harnessing said kinetic energy comprises the step of discharging said falling water into the ocean water surrounding said iceberg in a manner which provides propulsive thrust for said iceberg.

17. The method of claims 15 or 16, wherein said step of converting potential energy comprises the steps of:
using the temperature gradient between said iceberg and the surrounding ocean water to drive a heat-cycle engine to provide kinetic energy.

18. The method of claim 17, wherein said step of utilizing said kinetic energy comprises the steps of:
using said heat-cycle engine to drive an electrical generator to provide electrical power; and
using said electrical power to run electrical propeller-driving means.

19. A propulsion system for an iceberg, comprising:
first means for melting a portion of said iceberg;
second means for storing, during a first period of time, said melted portion as liquid water; and
third means for converting energy stored in said second means into power, utilizing the potential gravitational energy of said liquid water, to propel said iceberg during a second period of time, shorter than said first period of time.

20. The propulsion system of claim 19, wherein said first means comprises solar energy absorbing means, on the top surface of said iceberg.

21. The propulsion system of claim 19, wherein said third means comprises:
conduit means for conducting water falling from said second means downwardly into the ocean surrounding said iceberg, said water thereby developing a substantial head due to the height differential between said second means and the surface of the ocean; and
water nozzle means, in communication with said conduit means and submerged below the surface of said ocean, for discharging said water into the ocean in a manner which provides thrust to propel said iceberg.

22. The propulsion system of claim 19, wherein said third means additionally utilizes thermal energy stored in said second means.

23. The propulsion system of claim 22, wherein said third means comprises:
a heat cycle engine deriving energy from a thermal gradient between the water stored in said second means and the water in the ocean surrounding said iceberg;
generator means, driven by said heat cycle engine, for producing an electrical current; and
propellor means driven by said electrical current.

24. The propulsion system of claim 23, wherein said heat cycle engine is a Carnot cycle engine having a first heat exchanger in the water in said second means and a second heat exchanger in said ocean water.

25. The propulsion system of claim 24, further comprising:
heat generating means;
a third heat exchanger responsive to the heat generated by said heat generating means; and
means for selectively providing energy to said Carnot cycle engine from the transfer of thermal energy between (a) said first and second heat exchangers, and (b) said second and third heat exchangers.

26. The propulsion system of claim 25, wherein said heat generating means comprises:
an internal combustion engine; and
a boiler for transferring waste heat from said internal combustion engine to said third heat exchanger.

27. An iceberg propulsion system, comprising:
means for melting a portion of said iceberg;
a reservoir on the upper surface of said iceberg for storing said melted portion as liquid water;
a heat cycle engine powered by the transfer of thermal energy between said liquid water in said reservoir and the ocean water around said iceberg, comprising:
means for raising the temperature of said liquid water substantially above the temperature of said ocean water;
an electrical generator driven by said heat cycle engine;
a plurality of propellors driven by the electrical current produced by said generator;
a conduit leading from said reservoir downwardly into said ocean water;
means for selectively allowing liquid water from said reservoir to fall the length of said conduit into said ocean water, the vertical length of said conduit being sufficient to allow said water to develop a substantial head;
means connected to the bottom of said conduit for discharging said water into said ocean water so as to provide a significant amount of thrust to propel said iceberg; and
means for controlling the direction in which said water is discharged into said ocean water.

* * * * *